F. H. SNYDER.
MINT PLANTER.
APPLICATION FILED AUG. 27, 1908. RENEWED JAN. 13, 1910.
964,820.
Patented July 19, 1910.
2 SHEETS—SHEET 1.
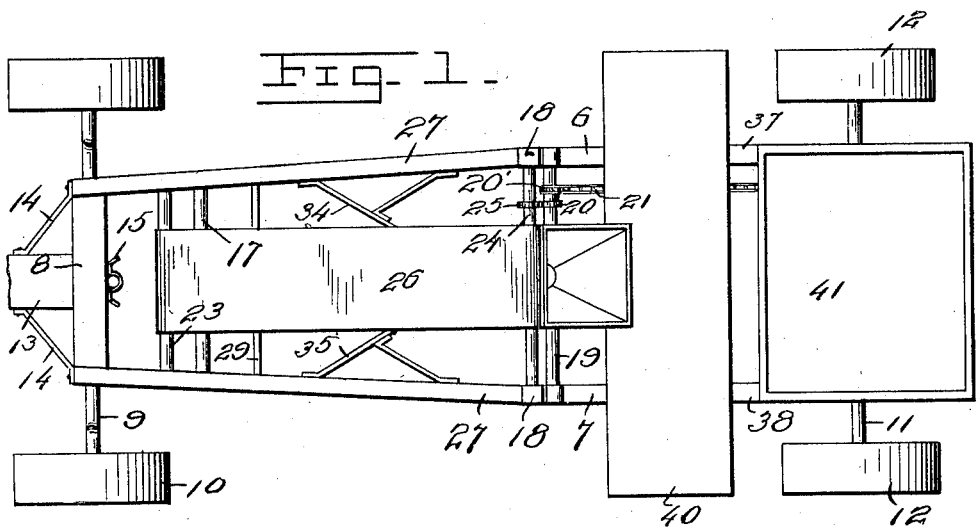
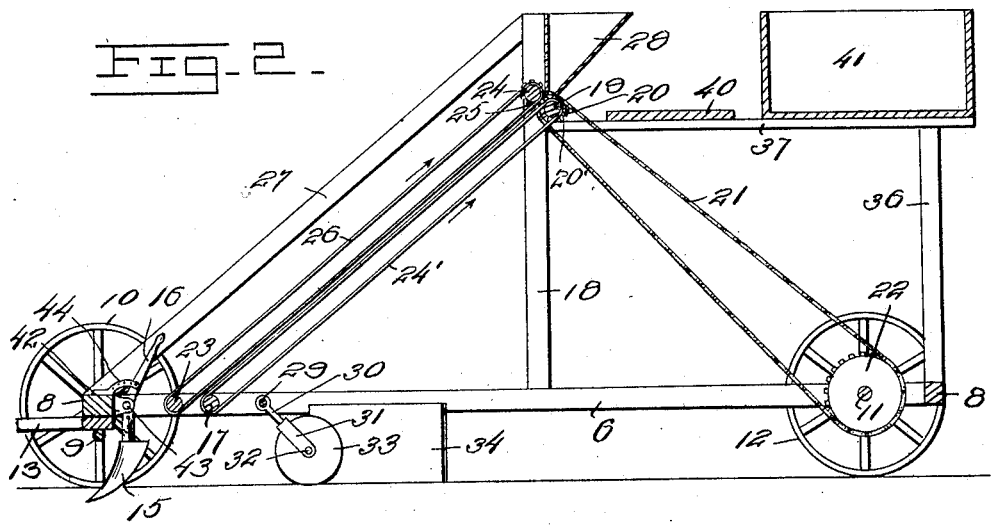

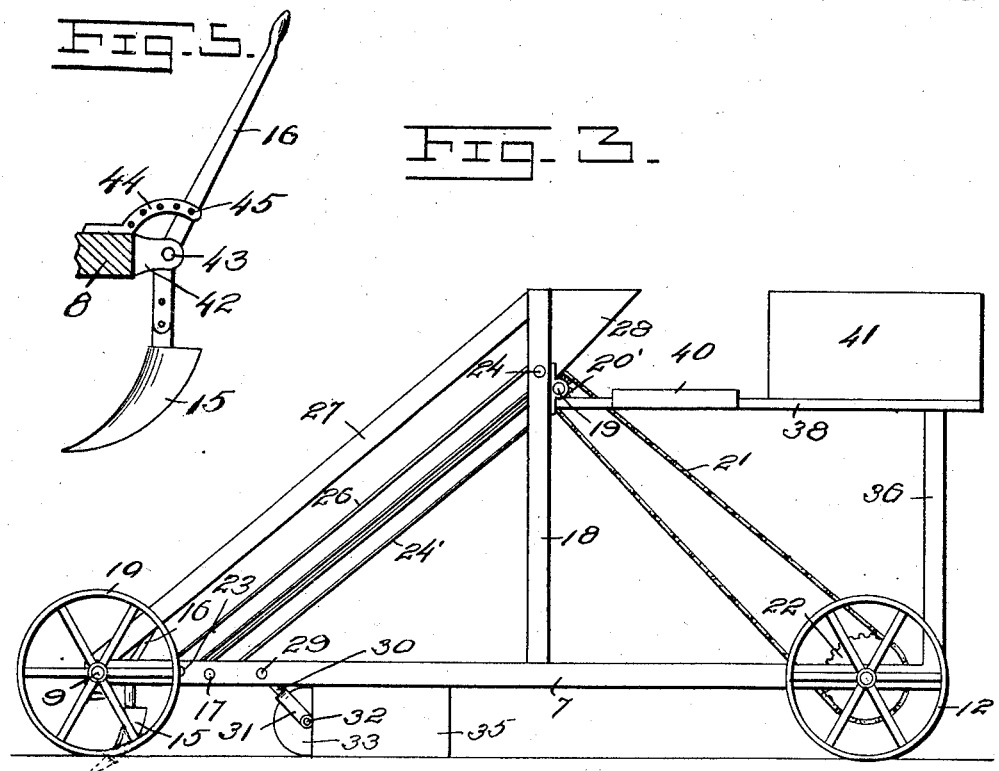

UNITED STATES PATENT OFFICE.

FRANK H. SNYDER, OF BRONSON, MICHIGAN.

MINT-PLANTER.

964,820. Specification of Letters Patent. Patented July 19, 1910.

Application filed August 27, 1908, Serial No. 450,531. Renewed January 13, 1910. Serial No. 537,932.

*To all whom it may concern:*

Be it known that I, FRANK H. SNYDER, a citizen of the United States, residing at Bronson, in the county of Branch and State of Michigan, have invented certain new and useful Improvements in Mint-Planters, of which the following is a specification.

This invention relates to planters and more particularly to a machine for planting mint roots, and has for an object to provide a machine which will be simple in construction, inexpensive to manufacture, and which will effectively serve to plow the earth, drop the mint root, and finally cover the same.

Other objects and advantages will be apparent from the following description and it will be understood that changes in the specific structure shown and described may be made within the scope of the claim without departing from the spirit of the invention.

In the drawings forming a portion of this specification, and in which like numerals of reference indicate similar parts in the several views, Figure 1 is a top plan view of the present invention, Fig. 2 is a longitudinal sectional view, Fig. 3 is a side elevational view, Fig. 4 is a detail sectional view of the endless belts and the feed hopper, Fig. 5 shows an enlarged detached detail of the adjusting shovel.

Referring now more particularly to the drawings, there is shown a longitudinally disposed frame consisting of spaced angle iron beams 6 and 7 respectively connected at their ends by cross members 8. Adjacent the front end, the frame is provided with an axle 9 having mounted thereon suitable supporting wheels 10 as shown. Adjacent the rear end, the frame is provided with a similar axle 11 which carries the supporting wheels 12 of suitable construction. The frame is provided with a draft pole 13 connected to the axle 9 by means of brace rods 14. Adjacent the front end, the frame is provided with a furrow opening shovel 15 connected by levers 16 which are also carried by the frame, and by means of which the shovel may be adjusted to bring the same above the ground when the machine is not in use. Adjacent the forward end, the frame is provided with a transversely extending roller 17, and rearwardly of the roller the frame is provided with vertical posts 18 which support a roller 19 similar to the roller 17, and this roller is provided with a gear wheel 20' which receives a drive chain 21 engaged with a sprocket wheel 22 carried by the rear axle 11. The rollers 17 and 19 receive an endless belt 24' preferably of canvas or similar material. Forwardly of the roller 17, the frame is provided with a similar roller 23, and carried by the post 18 and disposed above the roller 19 there is shown a similar roller 24 provided with a gear wheel 25 in mesh with the gear wheel 20, as shown. The rollers 23 and 24 receive an endless belt 26 similar to the belt 24' previously described. The posts 18 are braced by diagonal members 27 carried by the member 8. It will thus be seen that the upper face of the belt 24' is arranged in parallel relation to the under face of the belt 26. Disposed above the rollers 19 and 24 there is shown a hopper 28 having its lower open portion directed toward the entrance of the two belts just described. Rearwardly of the roller 17, the frame is provided with a cross member 29 and thus supports a frame 30 having parallel spaced members 31. The members 31 are provided at their lower ends with an axle 32 which supports a roller 33, as shown. Rearwardly of the roller 33, the frame is provided with angularly disposed covering blades 34 and 35 respectively which have their rear ends in spaced relation to each other and which lie directly behind the roller 33.

At the rear end, the frame is provided with vertical posts 36 which support longitudinally disposed sills 37 and 38 respectively. The sills 37 and 38 support a platform 40, and to the rear of this platform 40, is positioned a hopper or root container 41 carried by the frame members 37 and 38.

In use, the machine is driven through the field, it being understood that the shovel 15 has been adjusted for engagement with the ground to dig a furrow, and in movement of the machine it is obvious that power from the rear axle 11 will be transmitted to the belts 24' and 26 respectively which travel in the direction of the arrows as shown in Fig. 2 of the drawings. Roots are removed as desired from the container 41 and deposited in the hopper 28, whereupon, the roots will be engaged between the belts 24' and 26 respectively and conveyed rearwardly of the shovel 15 and dropped in the furrow cut thereby. In further travel of the machine it will be understood that the roller 33 effectively presses the roots into the ground which are afterward covered with soil by the blades 34 and 35 respectively. The shovel 15 is secured to a lever 16, held by a pivot 43 to the ear 42. The lever is held in a working position by means of a pin 45 fastened through an opening in the bracket 44, secured to a member 8.

What is claimed is:

A mint planter having in combination, a wheel supported frame, an adjustably held furrow opening shovel secured to the forward end of said frame, two transversely extending parallel rollers held in spaced relation above and to the rear of said shovel, two posts carried by said frame, said posts being positioned rearward of said rollers, two rollers held in parallel spaced relation near the upper end of said posts, two endless aprons passing over said upper and forwardly positioned rollers, a hopper secured to said posts having its feed opening positioned between said upper rollers, a gear secured to each of said upper rollers, said gears meshing, a packing roller movably secured to said supporting frame to the rear of said first mentioned rollers, two angularly disposed covering blades carried by said frame and secured to rear of said packing roller, and means to rotate one of said gear connected rollers.

In testimony whereof I affix my signature, in presence of two witnesses.

FRANK H. SNYDER.

Witnesses:
A. LE ROY LOCKE,
JESSIE SHERMAN.